(12) United States Patent
Miers

(10) Patent No.: US 6,505,568 B1
(45) Date of Patent: Jan. 14, 2003

(54) MECHANISM FOR CHEMICALLY AND BIOLOGICALLY TREATING TURF

(75) Inventor: Roger Miers, Cape Coral, FL (US)

(73) Assignee: Hendrix and Dail, Inc., Palmetto, FL (US)

( * ) Notice: Subject to any disclaimer, the term of this patent is extended or adjusted under 35 U.S.C. 154(b) by 0 days.

(21) Appl. No.: 09/901,533

(22) Filed: Jul. 9, 2001

(51) Int. Cl.[7] .............................................. A01C 23/00
(52) U.S. Cl. ...................................... 111/121; 111/162
(58) Field of Search ................................ 111/118, 121, 111/122, 157, 160, 161, 162, 163, 164, 167, 57, 54, 60; 172/4.5; 239/147, 172

(56) References Cited

U.S. PATENT DOCUMENTS

| | | | |
|---|---|---|---|
| 3,194,194 A | * | 7/1965 | Phelps |
| 3,437,061 A | * | 4/1969 | Wells |
| 3,970,012 A | * | 7/1976 | Jones, Sr. |
| 4,191,262 A | * | 3/1980 | Sylvester |
| 4,987,841 A | * | 1/1991 | Rawson et al. |
| 5,027,724 A | * | 7/1991 | Ptacek et al. |
| 5,622,124 A | * | 4/1997 | Smith et al. |
| 5,642,677 A | * | 7/1997 | Meyer |
| 5,845,592 A | * | 12/1998 | Ridgley |
| 6,319,463 B1 | * | 11/2001 | Celli |

FOREIGN PATENT DOCUMENTS

| | | | | |
|---|---|---|---|---|
| CA | 1039118 | * | 9/1978 | ................ 111/121 |
| NL | 0158356 | * | 11/1978 | ................ 111/118 |

* cited by examiner

Primary Examiner—Victor Batson
(74) Attorney, Agent, or Firm—William E. Noonan

(57) ABSTRACT

An applicator mechanism is used in combination with a land vehicle and a source of fluid treatment substance to introduce the substance into a turf surface so that the turf surface is treated by the chemical. The applicator mechanism includes a frame mountable to the land vehicle. The frame is movably supported by gauge wheels and gauge rollers above the turf surface such as the frame is capable of being driven across the turf surface by the vehicle. At least one applicator unit is swivelably attached to and depends from the frame. The unit includes a sled slidably engaged in the turf surface and at least one coulter mounted axially rotatably to the sled and having a cutting edge that extends below the sled for engaging and cutting the turf surface. A chemical dispensing device is mounted to the sled rearwardly of the coulter and extends below the sled. The dispensing device is communicably interconnectable to the source of fluid treatment substance for introducing the substance into the turf surface cut by the coulter.

27 Claims, 9 Drawing Sheets

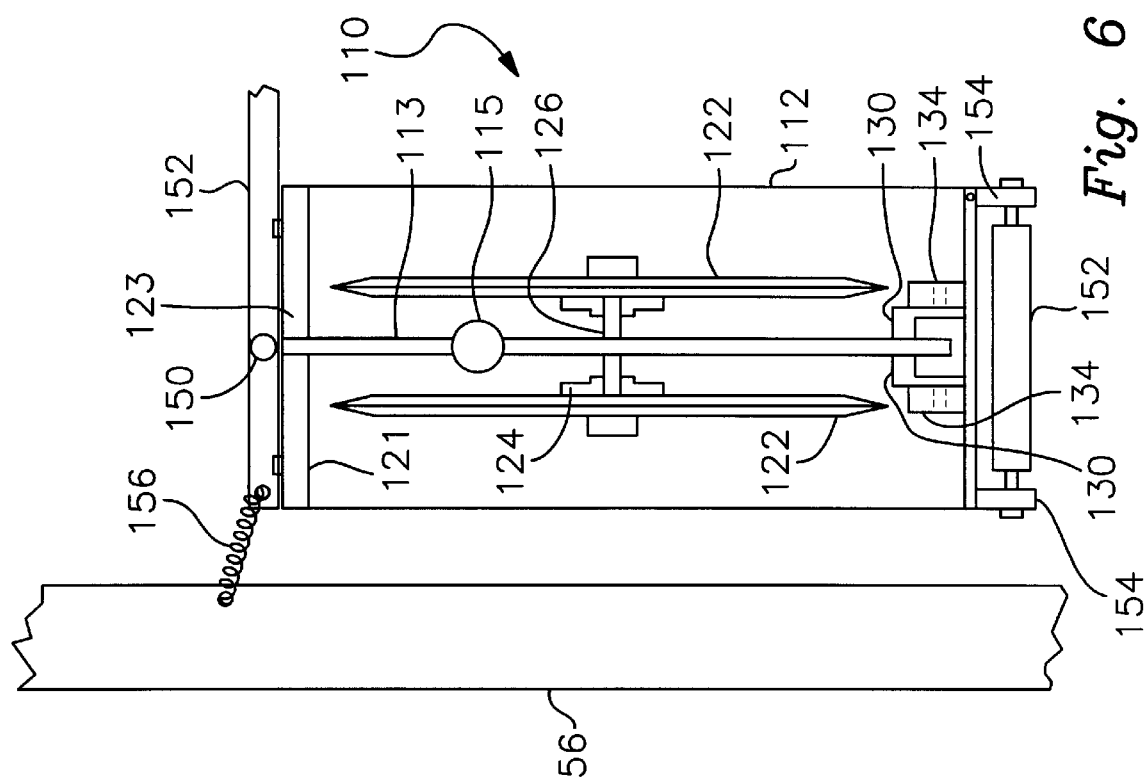
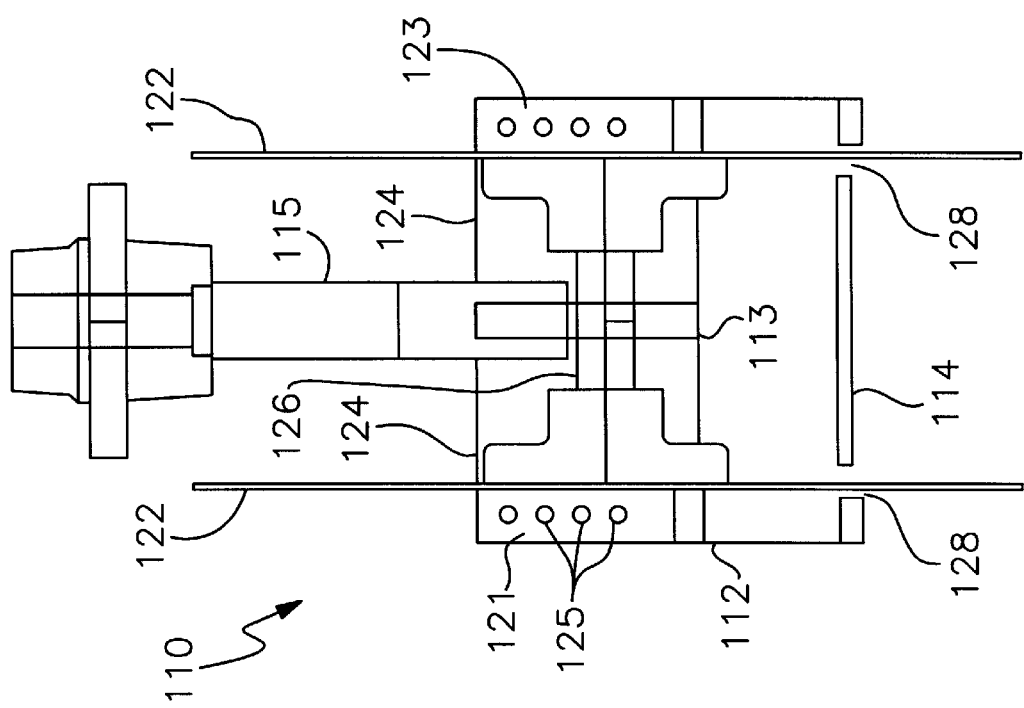
Fig. 6
Fig. 5

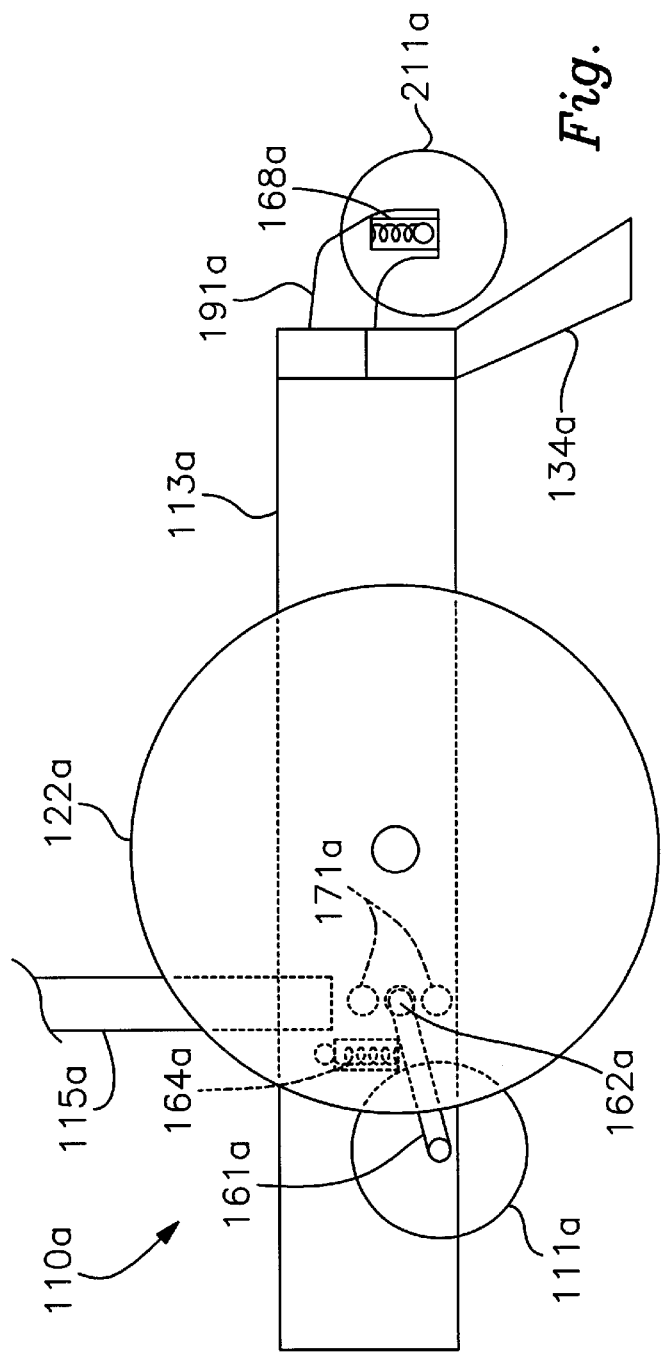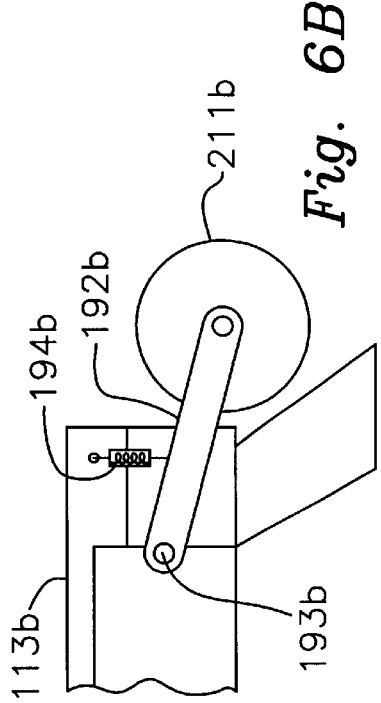

MECHANISM FOR CHEMICALLY AND BIOLOGICALLY TREATING TURF

FIELD OF THE INVENTION

This invention relates to an applicator mechanism driven by a tractor or other land vehicle for introducing a fluid chemical such as a pesticide or fertilizer into turf of the type found on a golf course, athletic field, sod farm or other grass covered area. The mechanism is also suitable for introducing a fluid containing beneficial organisms into the turf.

BACKGROUND OF THE INVENTION

Large grass covered expanses are commonly found on golf courses, athletic fields, sod farms and other locations. Many turf surfaces require regular treatment with fertilizers and pesticides. Golf course grasses are particularly susceptible to damage from worm-like pests known as nematodes. These minute creatures tend to attack the roots of the grass and can cause extensive and very costly damage to fairways, greens and other areas of a golf course. Over the years, nematodes have built up a high level of resistance to many types of pesticides and have become very difficult to eradicate.

Conventionally, golf courses and other grass covered areas have been treated for nematodes and like by chemicals such as Nemicure™ or Mocap™. Nemicure™ is typically sprayed topically onto the area to be treated. This is a difficult and delicate procedure that is likely to fail if too much is applied and especially if the treated area is exposed to intense sunlight. Accordingly, this type of chemical must be carefully monitored and is utilized only when weather conditions permit. Moreover, pesticides applied topically to the grass present a toxic risk to birds and animals and are generally unsatisfactory from an environmental perspective. These topical chemicals exhibit a strong unpleasant odor. Pests such as nematodes have developed a strong resistance to virtually all of these chemicals.

Alternatively, pesticides such as Telone™ based Curfew™ and Vapam™ based Turfcure™ have been developed which are injected beneath the turf. These based products are usually introduced into the soil at spot intervals. The chemical vaporizes and disburses through the turf so that nematodes and similar pests are killed. Unfortunately, this technique has a number of shortcomings. The chemical pesticide tends to spread only a few inches from the release point. As a result, to fully and successfully treat an area, a large number of closely spaced injection points are required. The treatment operation therefore tends to be very time and labor intensive. Controlling the proper amount of injected pesticide is also very difficult. If an insufficient amount is introduced, the nematodes are not eliminated; however, injecting too much chemical may severely damage the grass and again presents serious environmental hazards. Moreover, when the injection equipment is removed from the soil, chemical residue tends to be deposited and left on the surface of the grass. The liquid chemical also vaporizes and is apt to work its way to the top of the turf, which presents an additional danger that the grass will be permanently harmed. All of these factors, as well as the restricted, unsatisfactory disbursement of the injected chemical, have severely limited the effectiveness of this technique.

In an attempt to improve the application of chemicals to grass covered areas, an articulated tractor has been developed. This machine employs a row or gang of axially aligned, rotatable disks or coulters suspended from a supporting frame or tool bar. A knife mounted chemical injector is carried behind each coulter. The machine cuts parallel furrows in the turf and injects a pesticide such as TeloneTM™ into these openings. Although chemical injection is somewhat improved, this apparatus is also seriously limited in its effectiveness. It is especially difficult to maneuver the blades freely through curves and tight turns of the type encountered on golf courses and similar grass covered areas. The rotating blades are fixedly orientated relative to the supporting frame and are not permitted to swivel about a vertical axis relative to the frame. As a result, all of the blades must turn together in the direction of travel as the applicator frame turns. This can cause the blades to bind and jam in the turf during turning. Operation is interrupted and delayed while the operator reverses the tractor to free the blades. This binding also tends to rip, tear and damage the turf. Conventional coulter blades are especially likely to jam and bind in the turf because the weight of the frame and the blades bears directly upon the turf. The machine currently available does not employ any apparatus for relieving this pressure and enabling the blades to cut more freely through the turf.

The relatively poor maneuverability of the foregoing chemical applicator is a particularly serious drawback when the machine is used to treat golf courses. These types of grass covered areas normally exhibit a wide variety of winding and rolling topographical features and contours defining the fairways, roughs, greens, etc. A tractor chemically treating the golf course, must be prepared to make many turns. Optimal maneuverability is required. Such maneuverability is simply unavailable using the known applicator machine because that mechanism is so susceptible to coulter binding. This severely limits the amount of acreage the machine can cover in a day.

A further problem with the conventional articulating applicator unit is that it employs a relatively low horsepower tractor. Typically, the mechanism is able to cover and treat an area of only about five acres per day. It may take a week or more to chemically treat an entire golf course. The treatment process is therefore very time consuming, labor intensive and expensive.

I have determined that a need also exists for improved biological treatment of turf. Occasionally, it is desirable to introduce beneficial nematodes into a grass turf in order to attack pests such as mole crickets. Conventionally these beneficial organisms are mixed in a fluid slurry that is applied to the turf by a standard seeder. The depth at which the slurry is introduced into the turf cannot be controlled. As a result, optimally beneficial results are difficult to achieve. Indeed, none of the known machines for chemically or biologically treating turf allow for adjustment of the depth at which the treating substance is disposed so that the most effective treatment possible is achieved.

SUMMARY OF THE INVENTION

It is therefore an object of this invention to provide an improved apparatus for quickly, efficiently and successfully introducing a pesticide, fertilizer or other chemical treatment into a turf surface of the type found on a golf course, athletic field, sod farm or other grass covered area.

It is a further object of this invention to provide a chemical applicator mechanism that introduces chemicals at depths under a turf surface such that improved chemical disbursement and successful treatment are achieved.

It is a further object of this invention to provide a chemical applicator that applies chemicals to a turf surface much more completely, efficiently, safely and effectively than known topical and spot injection application techniques.

It is a further object of this invention to provide a chemical applicator that allows chemicals to be introduced into a turf surface without creating an undue risk of damage to the grass or the surrounding environment.

It is a further object of this invention to provide a chemical applicator that provides much better coverage and chemical disbursement than conventional machines and which significantly reduces the time, labor and expense involved in chemically treating a grass covered area.

It is a further object of this invention to provide a chemical applicator that may be maneuvered quickly and effectively over golf courses and other contoured grass covered areas.

It is a further object of this invention to provide a chemical applicator that may be driven over golf courses and other grass covered surfaces without causing undue damage to the turf.

It is a further object of this invention to provide a chemical applicator which permits its cutting disks or coulters to maneuver effectively through a turf surface without excessive binding and jamming and which therefore expedites and facilitates the chemical treatment process while significantly reducing damage to the turf.

It is a further object of this invention to provide a chemical applicator that is especially effective for treating a grassed area with fertilizers and pesticides.

It is a further object of this invention to provide a chemical applicator which is adapted for use with a large horsepowered tractor so that chemical treatment is facilitated and expedited and a much more efficient operation is achieved.

It is a further object of this invention to provide a chemical applicator that may be effectively utilized on grass covered areas having a wide variety of topographies and contours.

It is a further object of this invention to provide a chemical applicator that is particularly successful in eradicating nematodes and similar pests from golf courses and similar grass covered areas.

It is a further object of this invention to provide an apparatus that may be quickly and conveniently adjusted so that a chemical or biological substance may be injected into a turf surface at an optimally desirable and effective depth.

It is a further object of this invention to provide an apparatus for effectively introducing beneficial organisms into a turf surface so that insect pests are successfully eradicated.

It is a further object of this invention to provide a biological organism applicator that exhibits the foregoing advantages.

This invention results from a realization that the maneuverability of a chemical applicator for treating grass covered areas will be improved considerably by mounting the cutting blades or coulters so that they swivel either individually or in pairs relative to the applicator frame. This invention results from the further realization that the applicator will be able to cut much more easily through the soil, without binding or jamming by employing forward gauge wheels and rearward gauge rollers that relieve the pressure that the cutting disks exert on the soil.

This invention features an applicator mechanism used in combination with a land vehicle and a source of a fluid treatment substance (e.g. fertilizer, pesticide, nematode slurry etc.) for introducing the substance into a turf surface so that the surface is treated by the substance. The applicator mechanism includes a frame mountable to the land vehicle. There are rotatable means for movably supporting the frame above the turf surface such that the frame is capable of being driven across the turf surface by the land vehicle. At least one applicator unit is swivelably attached to and depends from the frame. The unit includes a smoothing carriage for movably engaging and bearing against the turf surface. At least one coulter is mounted axially rotatably to the carriage and has a cutting edge that extends below the carriage for engaging and cutting the turf surface. A dispensing device is mounted to the carriage rearwardly of the coulter and extends below the carriage. The dispensing device is communicably interconnectable to the source of fluid treatment substance for introducing the substance into the turf surface cut by the coulter.

In a preferred embodiment, the frame may include a central portion and at least one wing portion that is hingedly mounted to the central portion and selectively pivoted between raised and lowered positions. The rotatable means may include means that are disengaged from the turf surface in the raised position and engaged with the turf surface in the lowered position. At least one applicator unit may carried by the central portion and at least one unit may be carried by each wing portion.

The smoothing carriage may include a sled for slidably engaging the turf and/or one or more rollers for rotatably engaging the turf. The sled may include a longitudinal slot that receives the coulter such that the cutting edge of the coulter extends below the sled. The sled may further include a vertically adjustable slide pad and means for adjusting the height of the slide pad. A forward portion may extend upwardly from the slide pad. The forward portion may include a beveled lower end for flattening obstructions in the turf surface and preventing the turf from bunching. The smoothing roller may be spring biased into engagement with the turf surface. The smoothing device may be vertically adjustable for selectively raising and lowering the depth to which the coulter cuts into the turf.

The applicator unit may further include a pair of substantially parallel, axially interconnected coulters. A swivel assembly may interconnect the frame to the smoothing carriage between the parallel coulters such that the carriage is capable of swiveling about a generally vertical axis relative to the frame. More particularly, the applicator unit may include a mounting member fixedly connected to the smoothing device and to which a first component of the swivel assembly is fixed. The swivel assembly may have a second component that is fixed to the frame and swivelably interengaged with the first component. A plurality of applicator units may be attached to the frame and means may be provided for enabling the units to swivel in unison.

Each applicator unit may include a knife component fixedly attached to and depending below the carriage behind each coulter of the unit. The knife component cuts through the turf after the turf is initially broken by the coulter. Preferably, a dispensing device is mounted on each knife component. A turf compression roller may be carried rotatably by the sled for compressing the turf surface after the turf surface is cut and chemical or other treatment substance is introduced therein.

The rotatable means may include forward gauge wheels that are mounted to a front end portion of the frame such that the gauge wheels are both axially rotatable about a generally horizontal axis and swivelable relative to the frame about a generally vertical axis. The rotatable means may also include rearward gauge rollers axially rotatably supported by a rearward portion of the frame. Means may be provided for adjusting the height of the forward gauge wheels and/or rearward gauge rollers. The gauge wheels and gauge rollers permit the height of the applicator unit to be adjusted so that maneuverability and operability are improved significantly. Specifically, the cutting blades are suspended and adjusted by the gauge wheels and rollers so that the full weight of the blades does not bear into the turf. Binding and jamming are thereby reduced. Such beneficial operation is further improved through the use of relief means for interconnecting the frame to the land vehicle. Such relief means may include a pneumatic or hydraulic accumulator attached to a slotted linkage.

The applicator mechanism may also feature means for selectively purging residual chemical or other treatment substance from the dispensing device. After the treatment is completed, but before the dispensing device is removed from the turf, pressurized gas is introduced through the dispensing device to discharge any fluid remaining in the dispensing device into the ground. As a result, residual and potentially harmful chemicals or other substances do not drip onto the surface of the grass when the applicator units are removed.

The mechanism may include a hinge assembly or other means that permit the applicator unit to move vertically independently of the other applicator units. The hinge assembly may include a pair of plates which hingedly interconnect the frame and the swivel assembly associated with the applicator unit. A locking apparatus may be selectively engaged with the hinge assembly to constrain pivoting of the plates and vertical movement of the applicator unit. The use of an individual hinge assembly for each applicator unit is particularly desirable in a version primarily intended for use on golf course greens and tees.

DETAILED DESCRIPTION OF PREFERRED EMBODIMENTS

Other objects, features and advantages will occur from the following description of a preferred embodiment and the accompanying drawings, in which:

FIG. 5 is an elevational, cross sectional view taken along line 5—5 of FIG. 4;

FIG. 6 is a top plan view of one of the applicator units;

FIG. 6A is an elevational side view of an alternative applicator unit;

FIG. 6B is an elevational side view of the rear end of an applicator unit employing a different type of spring biased smoothing roller;

Figure 1:
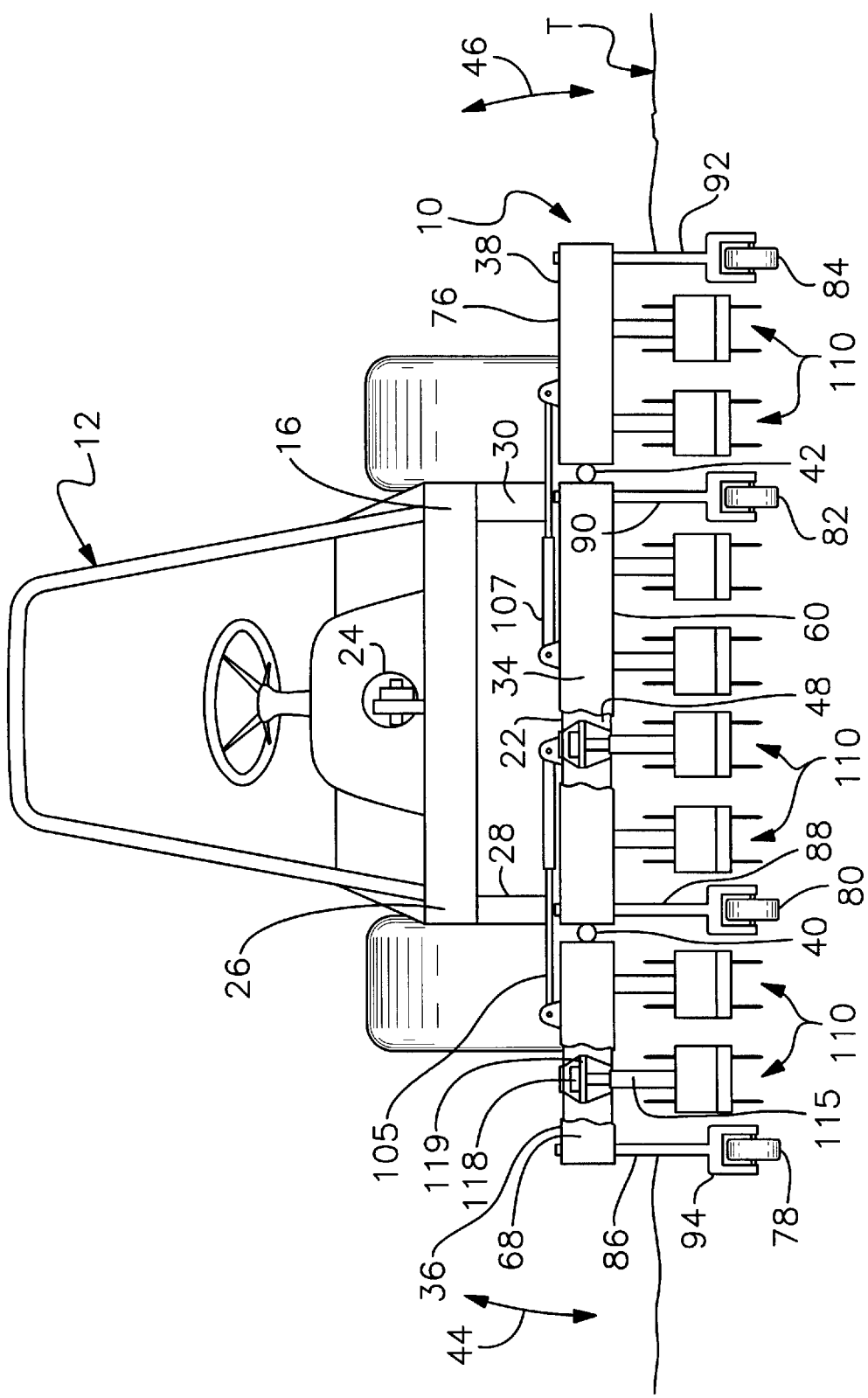
FIG. 1 is an elevational front view of a preferred applicator mechanism according to this invention, as attached to and driven by a relatively large horsepower tractor or similar land vehicle.
Figure 2:
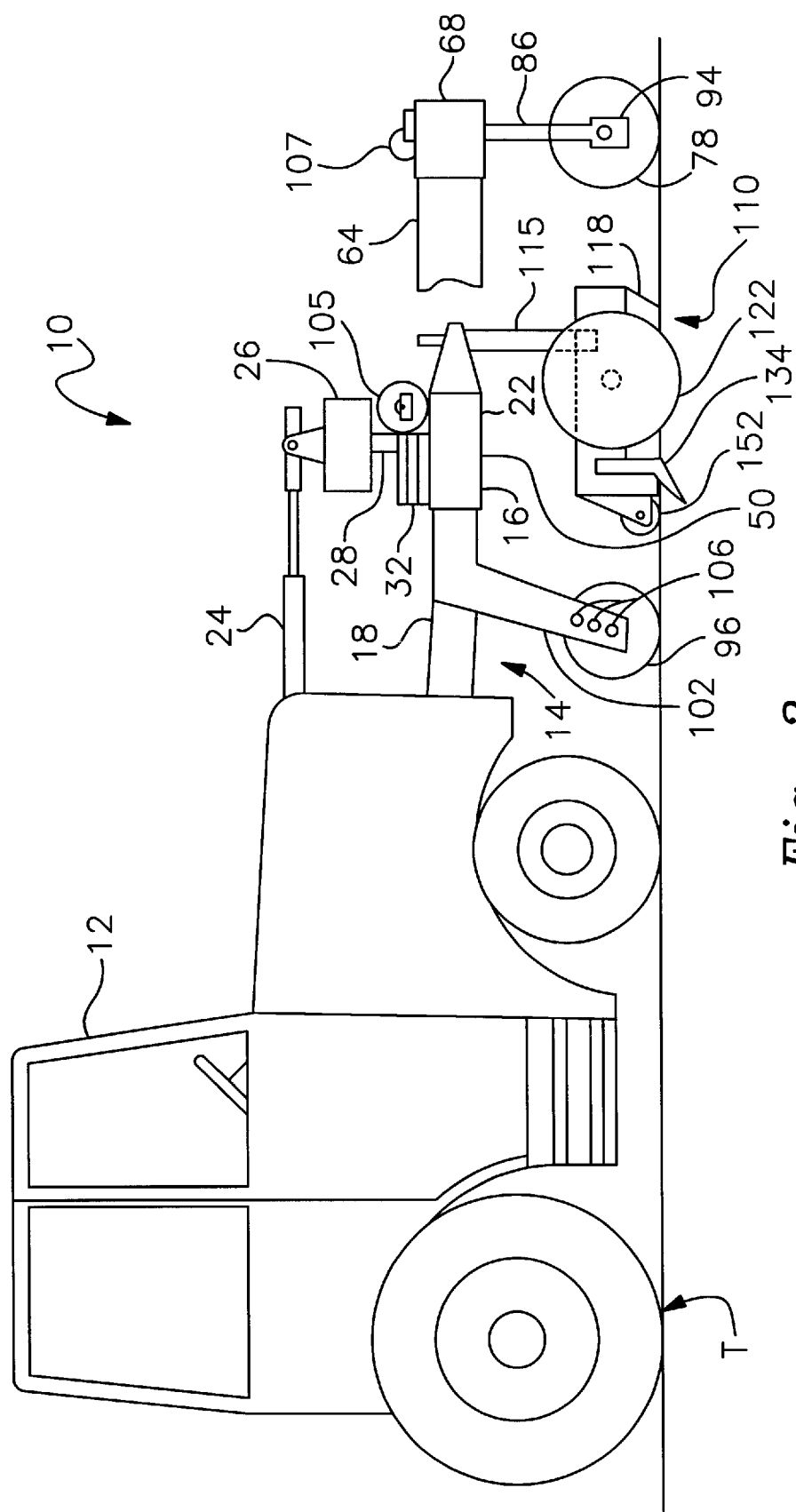
FIG. 2 is an elevational, partly cut away side view of the tractor and applicator mechanism.
Figure 3:
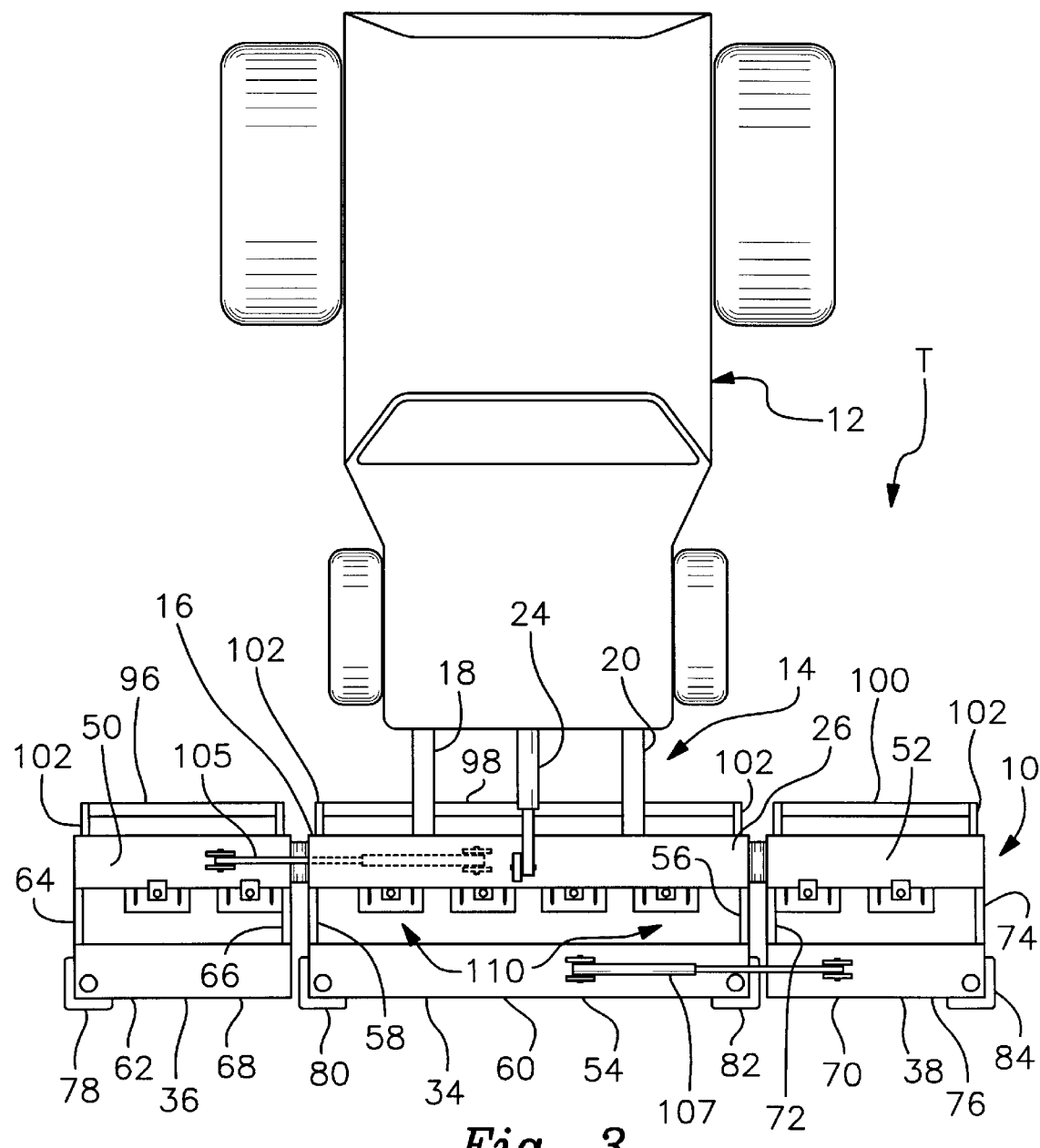
FIG. 3 is a to plan view of the tractor and applicator mechanism.

There is shown in FIGS. 1–3 an applicator mechanism 10 that is driven by a tractor 12 for chemically or biologically treating a grass covered area or turf surface T with a conventional pesticide or fertilizer, or alternatively with a slurry containing beneficial nematodes or other organisms. Applicator 10 is particularly effective for applying nematocides such as Turfcure™ to golf course surfaces. It should be understood, however, that the applicator is likewise effective for applying various other pesticides, fertilizers and chemical treatments to a wide assortment of other grass covered areas including athletic fields, sod farms, etc. Similarly the applicator is suitable for introducing beneficial biological organisms in a fluid slurry into a grass turf.

Tractor 12 exhibits a relatively powerful engine, e.g. typically at least 60 horsepower. This enables mechanism 10 to be driven quickly and efficiently across the grassed area being treated. In contrast, conventional articulated applicator units employ tractors having a fairly small horsepower. These tractors tend to stall when the cutting blades jam into the turf. The present invention enables the use of a much larger tractor which avoids and overcomes such jams, and allows far greater expanses to be treated in a faster, more efficient fashion. It should be understood, however, that applicator mechanism 10 may be employed with various types and sizes of tractors and other land vehicles. Additionally, although the applicator mechanism is depicted as mounted to the front of the tractor by a three point hitch mechanism 14 (FIGS. 2 and 3), in alternative embodiments, the applicator mechanism may be pulled behind a tractor or other land vehicle.

As illustrated in FIGS. 1–3, mechanism 10 comprises a tool bar or frame 16 that is secured to the forward end of tractor 12 by three point hitch 14. It should be understood that the frame is shown in a somewhat simplified fashion. The frame may have various alternative configurations and components within the scope of this invention. Currently, tractor tool bars are widely employed for plows and similar mechanisms. The particular structure of the frame will be apparent to persons skilled in the art and may be altered considerably within the scope of this invention. The principal function of the frame is to support the applicator units, wheels and rollers, which are described more fully below, such that those components may be driven effectively by the tractor to perform chemical treatment. The tool bar or frame is typically constructed using steel or other heavy-duty metal or metal alloy components.

Three point hitch 14 includes a pair of lift arms 18 and 20 that are secured, for example, to a transverse bar 22 of frame 16. A hydraulic relief mechanism 24, which is described more fully below, likewise interconnects the front of tractor 12 to an upper transverse bar 26 of frame 16. Bars 22 and 26 of frame 16 are themselves interconnected by depending vertical members 28 and 30, FIGS. 1 and 2, which are welded or otherwise permanently secured between the upper and lower bars of frame 16. As best shown in FIG. 2, lower bar 22 carries a plurality of weighted plates 32 which urge the applicator mechanism in contact with turf T. These weighted plates may be added or removed to adjust the depth at which chemical or other fluid is introduced into turf T. The plates are secured to lower bar 22 by various means such as bolts, welding, etc.

As best shown in FIGS. 1 and 3, frame 16 comprises a central portion 34 and a pair of wing portions 36 and 38 that are attached hingedly to central portion 34. Hinges 40 and 42, FIG. 1, permit wings 36 and 38 to pivot upwardly and downwardly relative to central portion 34, in the manner indicated by doubleheaded arrows 44 and 46 in FIG. 1.

Due to the hinged construction described above, frame 16 is effectively divided into lateral three sections. In particular, lower bar 22 includes a central segment 48, FIG. 1, and wing segments 50 and 52, FIG. 3, which are hingedly connected to central segment 48. The central portion 34 of frame 16 further includes a forward wheel-supporting extension 54, FIG. 3, comprising longitudinal elements 56 and 58 and a leading transverse element 60. These elements are typically welded or otherwise permanently interconnected to one another and to bar segment 48. Likewise, wing 36 includes a wheel supporting extension 62 comprising longitudinal elements 64 and 66, which are secured to and extend forwardly from respective ends of bar segment 50. A leading transverse element 68 interconnects longitudinal elements 64 and 66. Opposite wing 38 similarly includes a frame extension 70. Longitudinal elements 72 and 74 interconnect respective ends of bar segment 52 with corresponding respective ends of transverse element 76. Once again, these elements are preferably joined by welding or other permanent means. In FIG. 2, longitudinal element 64 is clearly shown interconnected to transverse element 68. The rearward portion of element 64, which is secured to bar segment 50, is cut away to depict the applicator unit of the invention. That unit is described more fully below.

The forward or leading end of frame 16 is supported above the ground by a plurality of gauge wheels 78, 80, 82 and 84, which are suspended from the leading extension portion of frame 16 by respective swiveling posts 86, 88, 90 and 92. Each wheel is axially rotatably mounted within a respective yoke 94. More particularly, wheels 80 and 82 are suspended from extension 54 proximate respective ends of frame element 60. Wheels 78 and 84 are likewise suspended from forward outside corners of extensions 62 and 70 respectively. A preferred manner of adjustably mounting the wheels to the frame is described more fully below. The wheels rotatably engage the upper surface of turf T and thereby support the forward end of the applicator frame above the turf.

The rearward or trailing portion of the applicator mechanism is supported movably about the turf by a series of rearward gauge rollers 96, 98 and 100, FIGS. 2 and 3. In particular, gauge roller 96 is mounted on frame segment 50 of wing 36 by a pair of mounting arms 102 attached to and depending rearwardly and downwardly from respective ends of segment 50. A representative one of these arms is best shown in FIG. 2. Similar arms 102 are carried by respective ends of frame segments 48 and 52 for rotatably mounting rollers 98 and 100 to central frame portion 34 and wing 38 respectively. It should be noted that rollers 96, 98 and 100 may comprise continuous or segmented rollers. Moreover, the height or position of these rollers may be adjusted, as shown in FIG. 2, by axially securing the rollers to a selected pair of aligned height adjustment holes 106 on opposing mounting arms 102. In this manner, the trailing end of applicator frame 16 is supported at a predetermined height above turf T. The advantages of this feature are described below.

The wings 36 and 38 are selectively raised and lowered by respective hydraulically or pneumatically operated pistons or accumulators 105 and 107, respectively. Piston 105 is mounted on bar segment 48 and includes a connecting rod that is attached to bar segment 50 of wing 36. Piston 107 is mounted on transverse element 60 of extension 54 and has a connecting arm that extends and is secured to transverse element 76 of wing 38. In FIG. 3, piston 105 is shown partially in phantom because that portion is mounted to bar segment 48 of lower bar 22 and is obscured by upper bar 26. Pistons 105 and 107 are hydraulically or pneumatically driven by the operator of tractor 12. In response to appropriate controls, which will be understood by persons skilled in the art, the connecting arm of piston 105 is selectively retracted to raise and extended to lower wing 36, in the manner depicted by doubleheaded arrow 44 in FIG. 1. Likewise, the operator controls piston 107 to selectively raise and lower wing 38 in the pivoting manner shown by doubleheaded arrow 46 in FIG. 1. When the wings are in the lowered position, gauge wheels 78 and 84 and gauge rollers 96 and 100 engage turf T. Conversely, when the wings are pivoted into a raised condition, the gauge wheels 78 and 84, and gauge rollers 96 and 100 and disengage the turf.

A plurality of chemical applicator units 110 are swivelably suspended from frame 16. In the embodiment depicted herein, eight applicator units are employed. Four units are mounted to the central portion 34 of frame 16 and wings 36 and 38 are provided with two units apiece. It should be understood that in alternative embodiments, other numbers of applicator units may be employed. Additionally, other versions of this invention may feature multiple rows of applicator units identical or similar to those described herein.

A representative one of the applicator units 110 is best depicted in FIGS. 2 and 4–6. Each such unit includes smoothing carriage comprising a metal sled that is suspended from and swivels about a generally vertical axis relative to frame 16. More particularly, sled 112 includes a mounting member 113 that is welded or other fixedly attached to the lower end of a swivel shank 115. The shank is itself rotatably interengaged with a swivel component 117 fastened by a connector 118 to a flange 119. The flange is itself welded or otherwise permanently secured to one of the segments 48, 50 and 52 of lower bar 22.

Mounting member 113 carries a pair of lateral extension sections 121, 123 proximate its leading end. Each extension sections carries a plurality of adjustment holes 125. The sled further includes a generally horizontal slide pad 114 and an upwardly extending foot 116 formed unitarily with pad 114 proximate the forward end of the pad. Foot 116 includes a beveled portion 118 proximate its lower end. This beveled portion functions in a manner that will be described more fully below. The upper end of foot portion 116 flushly engages extension section 121 and 123 of member 113 and carries a plurality of adjustment holes 120, best shown in FIG. 4. These holes are selectively aligned with corresponding holes 125 in extension sections 121 and 123 so that the height of the slide pad may be adjusted relative to member 113. This is accomplished by maneuvering the slide pad relative to mounting members 113 until selected corresponding holes in the slide pad and mounting member are aligned and a desired slide pad height is achieved. An appropriate form of interconnection such as threaded bolts or rivets are then interengaged with the aligned holes so that the slide pad is held at a desired height relative to the fixed mounting member 113.

Each applicator unit 110 further includes a pair of parallel, axially interconnected cutting disks or coulters 122. The coulters are secured to respective hubs 124 which are, in turn, rotatably interconnected by a shaft or axle 126 extending through an appropriate bearing assembly in mounting member 113. The coulters are preferably spaced apart by about 4.75". Slide pad 114 of sled 112 includes a pair of slots 128 through which the respective coulters 122 extend. Each coulter includes a peripheral cutting blade which therefore extends below sled 112.

Figure 4:
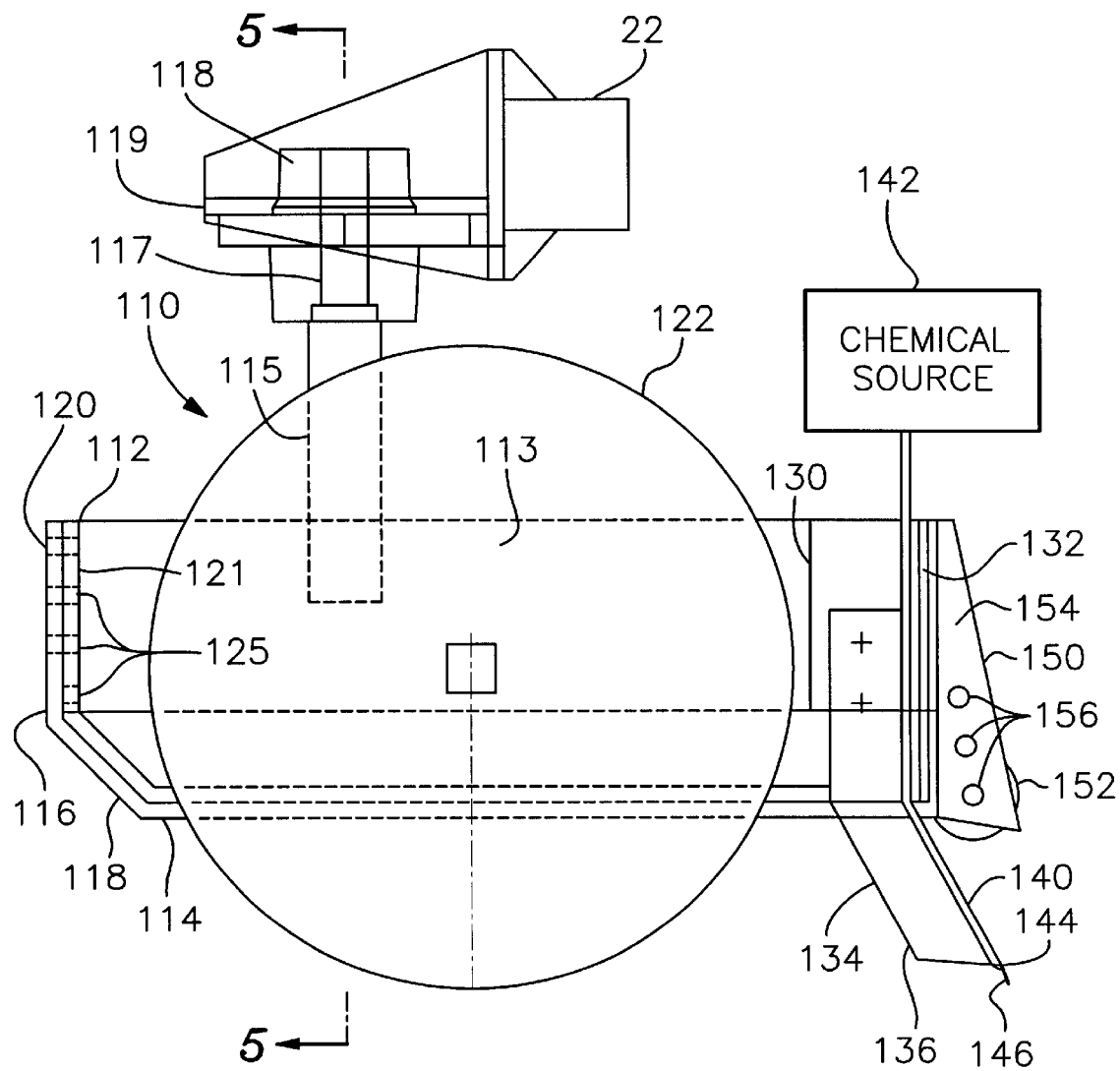
FIG. 4 is an elevational, cross sectional view of a representative one of the applicator units.

As best shown in FIGS. 4 and 6, a pair of mounting brackets 130 are interconnected to central mounting member 113 and a rearward wall 132 that extends upwardly from slide pad 114. Each mounting bracket supports a respective knife component 134 behind an associated coulter 122. The knife component is secured to bracket 130 by bolts or otherwise and includes a knife edged portion 136 that is angled rearwardly through a respective slot in the slide pad. As best shown in FIG. 4, the rearward edge of knife component 136 carries a chemical dispensing tube 140. A discharge nozzle 144 of tube 140 is formed proximate the lower end of the tube, which is at or proximate the lower end of knife component 134. Dispensing tube 140 is operably interconnected to a source of chemical 142 and is operated in a known fashion described below to dispense chemical from source 142. Nozzle end 144 carries a wire or needle 146 which prevents chemical from clogging in the tube.

Rearward wall section 132 of sled 114 carries a compression roller assembly 150. This assembly comprises a roller 152 that is rotatably mounted between a pair of generally triangular brackets 154. These brackets include a plurality of aligned adjustment holes 156. The roller may be positioned between and engaged with a selected pair of corresponding, aligned holes in brackets 154. In this manner, the height of the roller may be adjusted so that a desired degree of compression is provided to the underlying turf. This operation is described more fully below.

As best shown in FIG. 6, each of the units 110 supported within a respective one of the lateral portions of the frame (e.g. central portion 34 and wings 38 and 40) may be joined with the applicator other units in that frame portion to swivel in unison. For example, in FIG. 6 the unit 110 adjacent longitudinal frame bar 56 is shown. Unit 110 is connected by a pivot 150 to an elongate connecting rod or pittman arm™ 152. Each of the other units 110 suspended from central frame portion 34 is likewise pivotably connected to rod 152. The rod, and therefore each of the applicator units, in the central portion is resiliently attached to bar segment 56 by a coil spring 156. As a result, the units 110 in central portion 34 swivel together as the applicator mechanism turns or encounters topographical contours, but are still able to swivel independently of frame 16. This facilitates the maneuverability of the applicator mechanism and improves the efficiency and effectiveness of the chemical treatment process.

There is shown in FIG. 6A an alternative applicator unit 110a that features a different smoothing carriage than depicted above. Specifically, the smoothing carriage includes a pair of wheels or rollers 111a and 211a that are secured to a central mounting member 113a. As in the prior embodiment, a pair of coulters 122a (one of which is shown) are mounted rotatably to mounting member 113a. The mounting member is in turn mounted by a swivel 115a to the frame (not shown). A cutting knife 134a is mounted to the rearward end of mounting member 113a. The knife and the coulters depend below the mounting member such that they engage and cut the turf in a manner analogous to the previously described embodiment.

Rollers 111a and 112a are attached to mounting member 113a proximate the forward and trailing edges of coulters 122a. Roller 111a is connected to the mounting member by an arm 161a that is pivotably secured to member 113a at pivot 162a. Forward roller 111a is itself rotatably mounted to the distal end of arm 161a. A biasing accumulator or spring 164a urges arm 162a and attached roller 111a downwardly such that the roller bears against the turf as the applicator unit is driven over the turf by the tractor. At the same time, spring 164a allows roller 111a to retract upwardly when the applicator unit encounters bumpy or uneven terrain or obstructions (e.g. rocks, logs) in the turf.

Rearward roller 211a is also pivotably mounted in a slotted bracket 191a connect to member 113a. A spring or accumulator 168a likewise urges roller 211a to bear downwardly against the turf.

FIG. 6B depicts the rearward end of an applicator unit employing an alternative type of rearward wheel or roller. As shown in FIG. 6B, rearward wheel or roller 211b may be supported behind mounting member 113b by a trailing arm 192b that is itself pivotably mounted to member 113b by a pivot 193b. A piston 194b or other resilient means are interconnected between mounting member 113b and trailing arm 192b. This urges the rearward wheel or roller 211b to bear against the turf as the applicator unit is driven across the turf.

The smoothing rollers rotatably engage the surface of the turf as the applicator unit is driven over the turf and thereby hold the surface down as it is cut by the coulter and knife. The height of the rollers may be adjusted relative to the applicator unit in various ways. For example, the mounting member 113a may include height adjustment holes 171a to which mounting arm 161a is selectively attached. In this manner, the height of the rollers may be adjusted vertically. By lowering the rollers, the coulter and knife cut to a shallower depth. Alternatively, by raising the rollers, the coulter and knife cut deeper into the turf. As a result, the rollers act as a gauging or adjustment devices that enable the depth of the cut to be adjusted as required.

Preferably, a pair of rollers (or alternatively narrower wheels) are employed for each coulter in the applicator unit. In alternative embodiments, various other numbers and arrangements of smoothing rollers may be employed. It should also be understood that in some versions, the rollers and sled may be combined on one or more of the applicator units.

Figure 7:
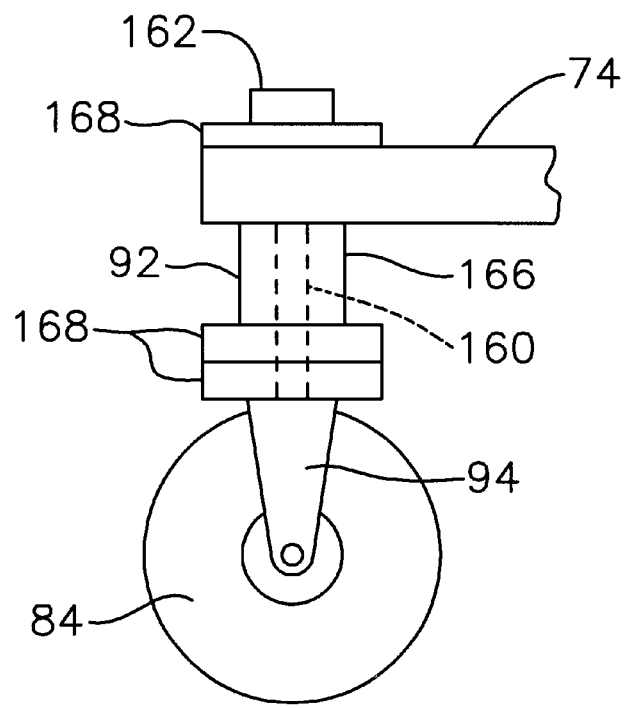
FIG. 7 is an elevational side view of a representative one of the forward gauge wheels.

A representative one of the gauge wheels 84 is depicted in FIG. 7. It should be understood a similar construction may be employed for each of the other gauge wheels in the apparatus. It should also be understood that wide various other constructions may be employed. In this version, wheel 84 is rotatably mounted in a yoke 94 that is carried at the bottom of a spindle assembly 92. The spindle assembly more specifically includes a shank 160 that extends from a head 162 through an opening in frame element 74. The shank extends through a bushing 166. A plurality of adjustment washers 168 are carried between element 74 and head 162 and likewise between bushing 166 and yoke 194. These adjustment washers may be added or removed to adjust the height of the wheel as required. By adjusting the height of each gauge wheel and similarly adjusting the height of the gauge rollers, in the manner previously described, the height of the entire applicator frame and therefore the position of the applicator units relative to the turf may be adjusted. During operation of the applicator mechanism, this permits the coulters and knife components to engage the turf at a desired depth and with a predetermined weight or pressure. By adjusting the gauge wheels and gauge rollers, the force that the applicator units exert on the turf may be adjusted for various turf thicknesses and topographical conditions and for the particular type of chemical treatment required.

Figure 8:
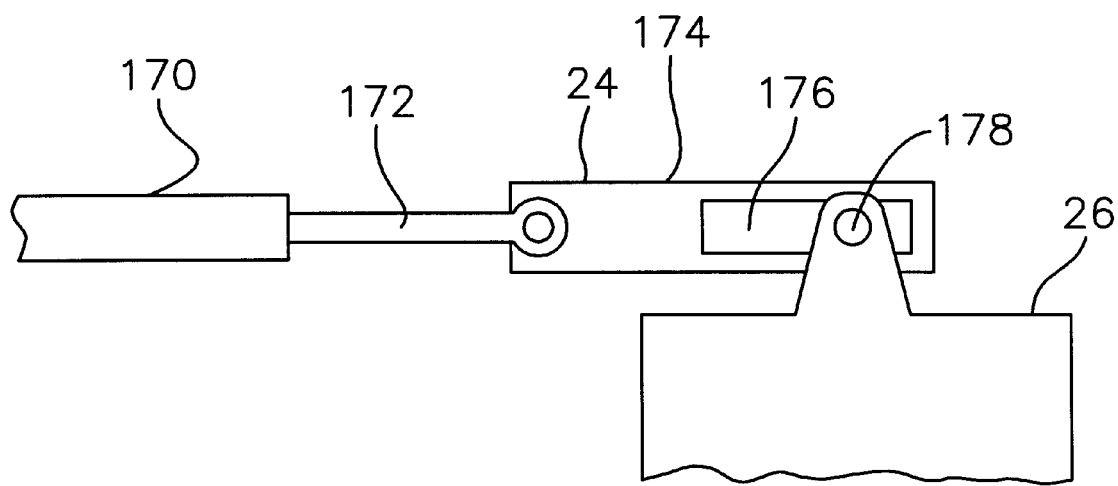
FIG. 8 is an elevational side view of the slotted linkage and relief mechanism interconnecting the tractor and the applicator mechanism.

The applicator mechanism is further able to effectively adjust for changing topographical features and obstructions that are encountered by the mechanism through the use of the slotted relief mechanism 24 shown more particularly in FIG. 8. Mechanism 24 includes a pneumatic or hydraulic piston 170 that is connected at the end (not shown) to the front end of the tractor. This mechanism typically comprises part of the three point hitch 14, shown in FIGS. 1–3. Piston 170 includes a connecting rod 172 that is pivotably secured to a linkage component 174. The linkage component has a slot 176 that is interengaged by a pin or other connector 178 carried by frame bar 26. As the applicator mechanism 10 is driven across turf T, the piston 170 and slotted interconnection between component 174 and frame 26 permits the frame of the applicator mechanism to tilt or "float" as required so that the applicator mechanism adjusts relatively effortlessly to underground obstructions such as rocks, logs and uneven surface contours, which are encountered. This reduces the tendency of the mechanism to jam and improves maneuverability and efficiency considerably.

The applicator units, blades, rollers and supporting hardware may be constructed of various durable metals, metal alloys and synthetic materials, which are commonly used for agricultural and earth moving machinery. The wheels may feature rubber and/or assorted plastic compositions known to persons skilled in the art.

Figure 9:
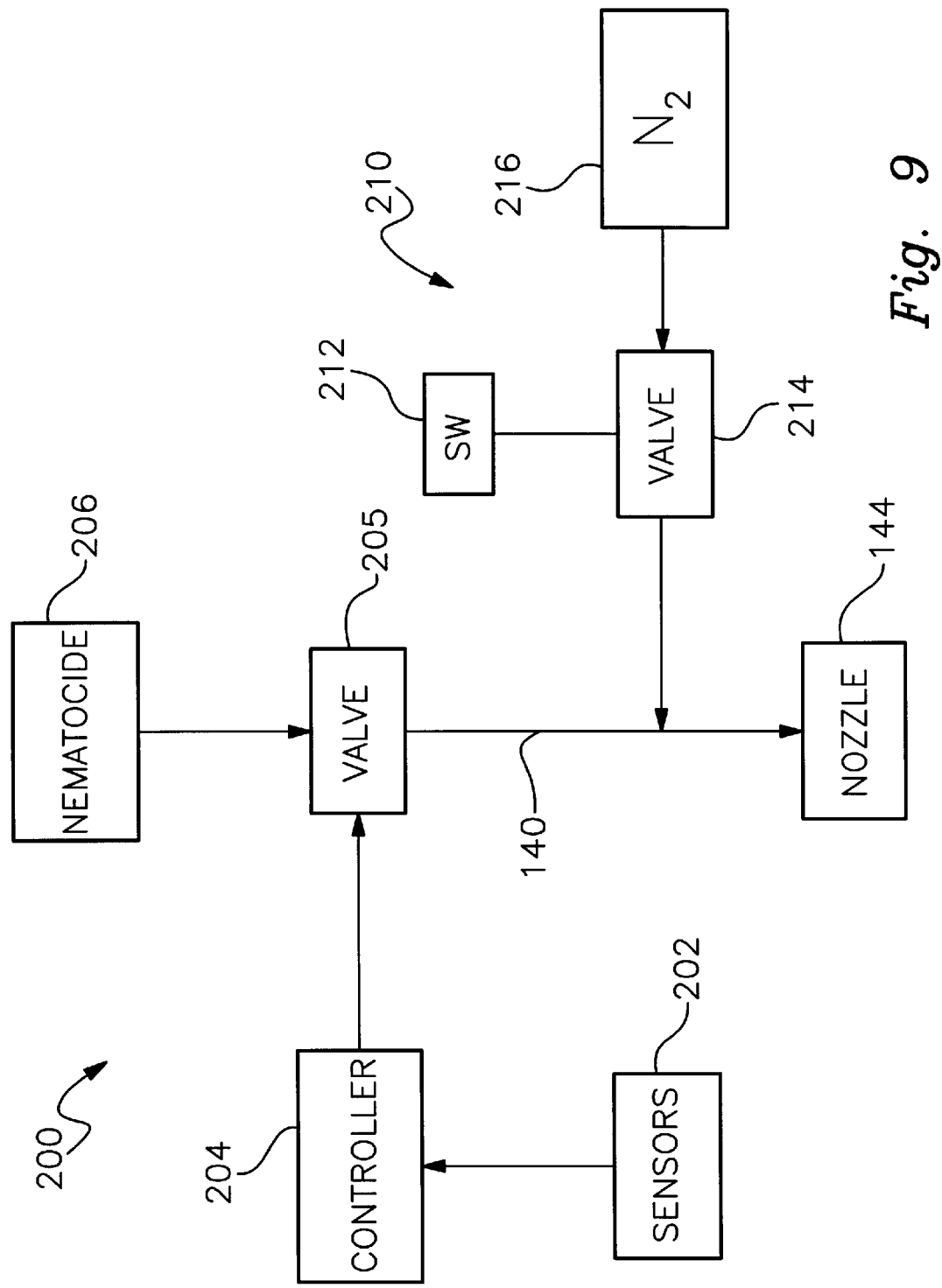
FIG. 9 is a schematic view of the chemical purging unit employed by the applicator mechanism of this invention.

Applicator mechanism 10 may utilize the chemical dispensing system 200 shown schematically in FIG. 9. The applicator may feature various known types of chemical dispensing systems such as the Red Ball™ system for monitoring the dispensing line. Sensors 202 monitor parameters such as the speed at which the tractor and applicator mechanism are traveling, as well as the topography and contour of the grass covered area being treated. Appropriate signals are sent to a controller 204, which may comprise a Raven™ controller or similar mechanism. The controller operates (opens and closes) a valve 205 so that the nematocide 206 or other chemical is selectively delivered at a predetermined rate through line 140 to dispensing nozzle 144. The nozzle dispenses the chemical into the furrow cut by the coulter and knife component which the nozzle follows. The nozzle of each applicator unit operates in an analogous manner.

As part of the present invention, the foregoing system may also include a purge apparatus 210 that is operably connected to line 140. Specifically, when the dispensing operation is completed, the operator of the tractor engages a switch 212. This opens valve 214 so that pressurized nitrogen 216 is delivered to line 140. The nitrogen purges any nematocide or other chemical remaining in line 140 outwardly through nozzle 144 and into the turf before the applicator unit and nozzle are lifted from the turf. As a result, residual chemical is discharged outwardly through the nozzle and into the furrow that has been cut by the applicator unit. This prevents excess chemical from dripping onto the surface of the grass after the nozzle is retracted from the furrow. Resulting damage to the grass surface is thereby averted.

In operation, tractor 12 pushes (and in alternative embodiments pulls) applicator mechanism 10 across an area of turf T being treated. Frame 16 and the suspended applicator units 110 are supported rotatably on the turf by the forward gauge wheels 78, 80, 82 and 84 and rearward gauge rollers 96, 98, 100. The gauge wheels and gauge rollers may be adjusted vertically, in the manner previously described, so that the applicator units are held at a height that forms furrows of a predetermined depth. This depth is preferably 4"–6" and in any event, is deep enough to provide improved and more effective injection of chemical into the soil. As the mechanism is driven across the turf, the coulters 122 and respective knife components 134 that follow the coulters form substantially parallel rows of furrows in the turf. As the furrows are being formed, the slide pads 114 of sleds 112 slide along the turf and hold the turf down so that it resists being pulled upwardly by the coulters and knives. Beveled portion 118 of sled 112 flattens the turf as the sled slides over the turf and prevents the turf from bunching ahead of the coulters and knives. At the opposite end of the coulter unit, the compression rollers 152 help to flatten the turf following the passage of the coulters and knives therethrough. Each of the applicator unit sleds 122 remains in firm engagement with the upper surface of turf T particularly because weights 32 are mounted onto frame 16. As a result, when the coulters and trailing knife components encounter obstructions, they tend to cut through rather than simply ride over those obstructions. The pressure of force with which the sled, coulter and knife interengage the turf may be further adjusted by varying the height of the frame through the previously described adjustment of the gauge wheels and gauge rollers.

As applicator mechanism is driven along the turf, the floating linkage depicted in FIG. 8 provides play so that the frame and suspended applicator units are able to maneuver conveniently through the turf and over obstructions such as boulders etc. If a topographical feature such as a bump or obstruction is encountered, the entire frame is allowed to tip rearwardly. Pin 178, FIG. 8, slides rearwardly within slot 176. Moreover, the connecting arm 172 is able to retract within piston 170. At the same time, connecting arm 172 pivots relative to linkage element 174. This structure enables the entire applicator mechanism to tilt and pivot (i.e. "float") to the degree required to provide effective operation of the applicator mechanism. Jamming and binding are reduced significantly.

The maneuverability and effective operation of applicator mechanism 10 are improved considerably through the use of the independently swiveling applicator units. In mechanisms of the prior art, all of the applicator units as well as the blades of such units must turn together with the frame. The blades proximate the inside of the turn are turning about a radius that is much shorter than that exhibited by the blades located proximate the outside of the turn. This results in the tendency of conventional units to jam and bind. Such problems are exacerbated when bumpy or uneven topographical surfaces are encountered.

In contrast, the applicator units of mechanism 10 swivel relative to the frame. Maneuverability and turning are facilitated. Binding and jamming are significantly reduced. Delays are avoided and a much quicker and more efficient chemical treatment is achieved. At the same time, the applicator units are operably interconnected as shown in FIG. 6. Although each unit is independently swivelable relative to the frame, the units are mechanically joined together so that they are able to turn more or less in unison and not in opposition to one another. This further contributes to a smooth and binding free operation and improved maneuverability.

Applicator mechanism 10 is particularly effective for treating golf courses where numerous tight turns are required and where a wide variety of topographical features are encountered. Nevertheless, it should be understood that the invention is also effective for treating athletic fields, sod farms and a wide variety of grass covered areas.

As the mechanism is operated, nematocide or other chemical is dispensed beneath the soil by nozzles 144, typically through the use of an automated controller as described above. After the chemical treatment completed, the operator purges the nozzles in the manner depicted in FIG. 9. The operator may then activate pistons 105 and 107 to pivotably lift the wings 36 and 38. The connecting arm 172 of piston 170 is also retracted to lift the frame and disengage the applicator units 110 from turf T. Applicator 10 may then be disconnected from the tractor or remain connected thereto as required. Typically, the applicator mechanism is transported (either with or without the accompanying tractor) by an appropriate trailer.

A number of distinct and interrelated advantages are achieved through the use of applicator mechanism 10. As previously described, the applicator mechanism resists jamming and is readily maneuverable over a wide variety of grass covered areas. The machine is readily adaptable for various contours and topographical features. The height of the coulters, knife components and injection nozzles, and therefore the depth of chemical injection into the soil, may be readily adjusted by adjusting the gauge wheels and rollers, as well as the weight carried on the frame. Because binding is reduced, the swivelable cutting blades can be adjusted to cut through the soil at greater depths than in the prior art. As a result, chemical can be introduced deeper and more effectively into the soil underlying the turf. Chemical is more completely disbursed and pests such as nematodes are more effectively eliminated by injecting the pesticide or other chemical at a substantial and heretofore unachievable depth (e.g. 4"–6") beneath the surface.

The mechanism described above may be modified somewhat and reduced in size so that it is suitable for use in treating golf course greens and tees. For example, a 30 horsepower tractor may be utilized to drive a mechanism featuring three or four applicator units identical or similar to those described above.

Figure 10:
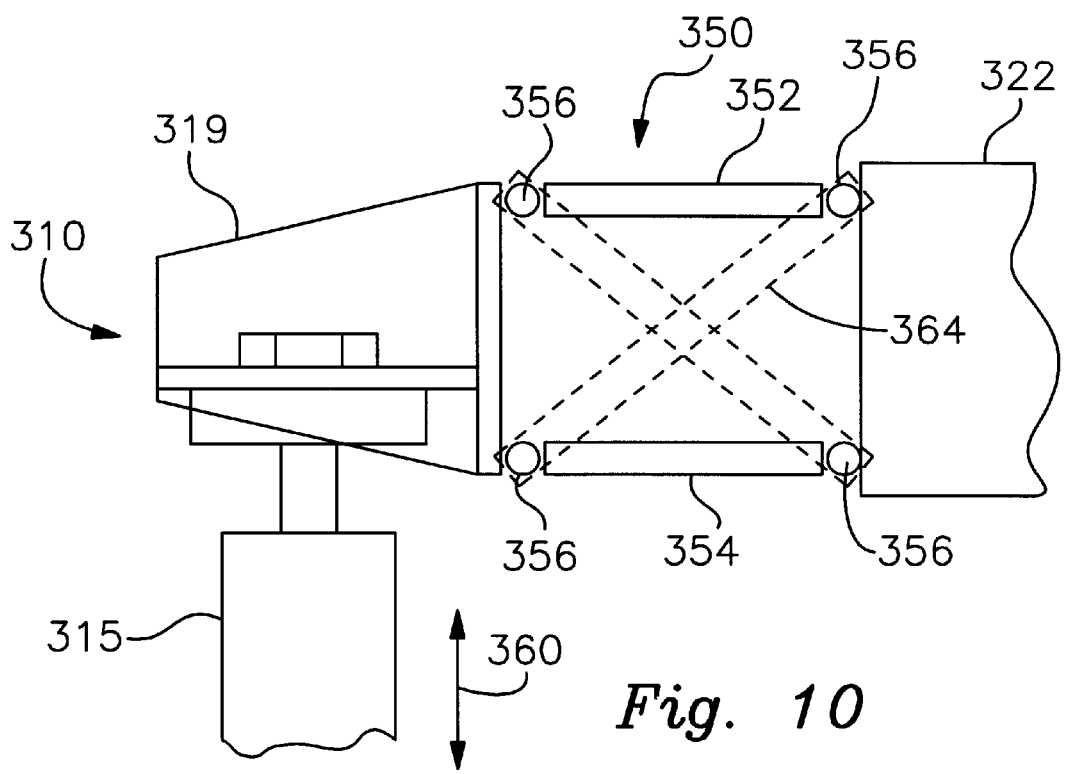
FIG. 10 is an elevational side view of a hinge assembly for interconnecting the frame to a respective applicator unit such that the unit is independently movable in a vertical direction.
Figure 11:
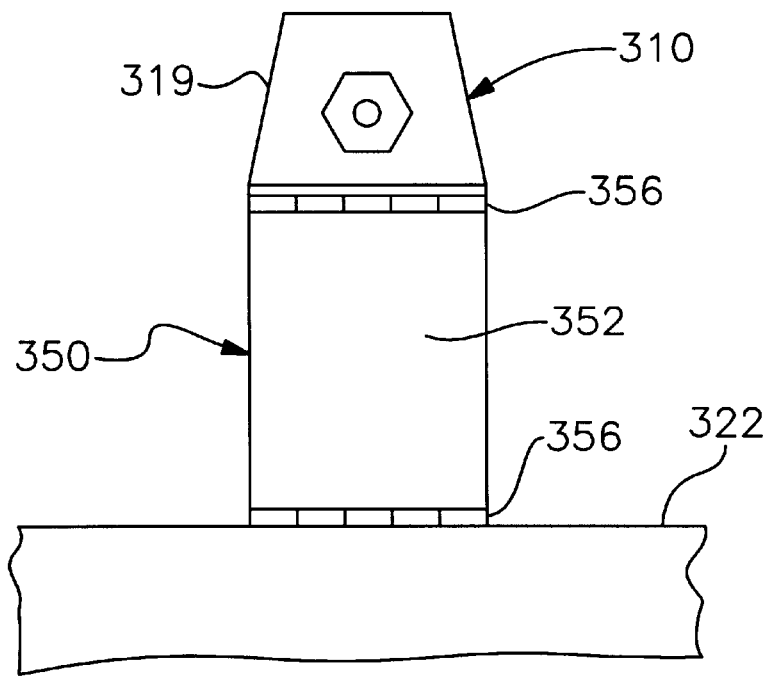
FIG. 11 is a top view of the hinge assembly.

In contrast to the previously described embodiment, wherein each applicator unit is more or less vertically fixed relative to the frame, the machine employed for golf course greens and tees preferably should exhibit independent vertical flexibility of each applicator unit. Greens especially tend to exhibit undulations and changes in contour. Accordingly, to maintain a consistent coulter depth, it is desirable for each applicator unit and attached coulter to be vertically self-adjustable while the applicator unit is being driven across the turf. This adjustability is provided, for example, by the structure shown in FIGS. 10 and 11. Each drawing depicts the upper end of a representative applicator unit 310 and, more particularly, a mounting bracket 319 and attached swivel 315 analogous to those previously described. Each applicator unit 310 is flexibly attached to tool bar 322 by a respective hinge assembly 350. This assembly comprises upper and lower plates 352 and 354 respectively that are interconnected between bracket 319 and tool bar 322 by hinges 356. Upper and lower plates 352 and 354 are substantially parallel to one another. As the machine is driven across the tee or green, the plates 352 and 354 of assembly 350 pivot about the hinges 356 formed at each end of each plate. This permits the applicator unit 310 to move upwardly and downwardly as indicated by double-headed arrow 360 in FIG. 10.

In certain applications, such as when the machine is being used to treat a fairway, the applicator units should remain vertically fixed relative to the tool bar and frame. Accordingly, structure is provided to lock each applicator unit 310 in place vertically relative to the frame. This may be accomplished by engaging an X-shaped brace or strap 364 with each end of assembly 350 such that each strap interengages diagonally opposed hinges. This prevents flexing between the applicator unit and the tool bar so that vertical movement of the tool bar is constrained. The X-shaped straps are selectively engaged and disengaged with assembly 350 to respectively lock and unlock the connection between the applicator unit and the tool bar. When the unit is unlocked, it is permitted to float over undulations and contours in the turf. Each applicator unit is able to float independently relative to the frame so that tees and green are cut and treated most effectively. However, when the hinge assembly is locked in place, such floating is restricted. In this manner, an effective, and consistent depth may be cut in the turf by the coulter.

It should be understood that the individual features described above in connection with the various versions of this invention may be interchanged within the scope of this invention. In some embodiments, a smaller sled may be employed. The guide wheels may be eliminated such that each applicator unit directly engages the turf without the assistance of guide wheels. Various forms of springs and pivots may be substituted for the hinge assembly 350.

The sliding sled, weighted frame and compression roller all serve to protect the turf and prevent undue damage to the turf as the chemical treatment is being performed. Adjusting the height of the frame and applicator units further serves to both improve the maneuverability of the mechanism and to reduce turf damage. The invention's unique use of a relatively large horsepower tractor permits expansive grass covered areas to be treated quickly and much more efficiently than has been possible using conventional applicators. The smaller unit is especially effective for efficiently treating smaller areas such as tees and greens.

From the foregoing it may be seen that the apparatus of this invention provides for an applicator mechanism driven by a tractor or other land vehicle for introducing a fluid chemical such as a pesticide or fertilizer into turf of the type found on a golf course, athletic field, sod farm or other grass covered area. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. An applicator mechanism for use in combination with a land vehicle and a source of a fluid treatment substance to introduce the substance into a turf surface so that the turf surface is treated by the substance, said applicator mechanism comprising:

a frame mountable to the land vehicle such that said frame is capable of being driven across the turf surface by the land vehicle; and at least one applicator unit swivelably attached to and depending from said frame, said unit including a smoothing carriage for movably engaging and bearing against the turf surface as said frame is driven across the turf surface, at least one coulter mounted axially rotatably to said carriage and having a cutting edge that extends below said carriage for engaging and cutting the turf surface and a fluid treatment substance dispensing device mounted to said carriage rearwardly of said coulter and extending below said carriage, said dispensing device being communicably interconnectable to the source of fluid treatment substance for introducing the substance into the turf surface cut by said coulter.

2. The mechanism of claim 1 in which said frame includes a central portion and at least one wing portion that is hingedly mounted to said central portion and selectively pivoted between raised and lowered positions, said rotatable means including means that are disengagable from the turf surface in said raised position and engagable with the turf surface in said lowered position.

3. The mechanism of claim 2 in which at least one said applicator unit is carried by said central portion and at least one unit is carried by each said wing portion.

4. The mechanism of claim 1 in which said applicator unit includes a pair of substantially parallel, axially interconnected coulters.

5. The mechanism of claim 1 in which said carriage includes a sled for slidably engaging the turf surface.

6. The mechanism of claim 1 in which said sled includes a longitudinal slot that receives said coulter such that said cutting edge of said coulter extends below said sled.

7. The mechanism of claim 4 in which said applicator unit includes a swivel assembly which interconnects said frame to said carriage between said coulters such that said smoothing device is capable of swiveling about a generally vertical axis relative to said frame.

8. The mechanism of claim 5 in which said sled includes a vertically adjustable slide pad and means for adjusting the height of said slide pad.

9. The mechanism of claim 1 in which said applicator unit includes a knife component fixedly attached to said and depending below said carriage for cutting through the turf surface behind said coulter.

10. The mechanism of claim 1 in which a turf compression roller is carried rotatably by smoothing device for compressing the turf surface after the turf surface is cut and chemical is introduced therein.

11. The mechanism of claim 9 in which said dispensing device is mounted on said knife component.

12. The mechanism of claim 1 in which said sled includes a generally horizontal side pad and a forward foot portion that extends upwardly from said slide pad.

13. The mechanism of claim 1 in which said forward foot portion includes a beveled lower end for flattening obstructions in the turf surface and preventing the turf surface from bunching.

14. The mechanism of claim 1 further including rotatable means for movably supporting said frame above the turf surface.

15. The mechanism of claim 14 in which said rotatable means includes forward gauge wheels that are mounted to a front end portion of said frame such that said gauge wheels are both axially rotatable about a generally horizontal axis and swivelable relative to said frame about a generally vertical axis.

16. The mechanism of claim 14 in which said rotatable means include rearward gauge rollers axially rotatably supported by a rearward portion of said frame.

17. The mechanism of claim 14 further including means for adjusting the height at which said rotatable means support said frame.

18. The mechanism of claim 1 further including relief means for interconnecting said frame to the land vehicle.

19. The mechanism of claim 18 in which said relief means include a slotted linkage assembly.

20. The mechanism of claim 1 further including means for selectively purging fluid treatment substance from said dispensing device.

21. The mechanism of claim 7 in which said unit includes a mounting member fixedly connected to said sled and to which a first component of said swivel assembly is fixed, said swivel assembly having a second component that is fixed to said frame and swivelably interengaged with said first component.

22. The mechanism of claim 1 in which a plurality of said applicator units are attached to said frame and further including means for enabling said units to swivel in unison.

23. The mechanism of claim 1 in which said smoothing device includes at least one smoothing roller for rotatably engaging the turf surface.

24. The mechanism of claim 1 in which said smoothing device is vertically adjustable for selectively raising and lowering the depth to which said coulter cuts into the turf surface.

25. The mechanism of claim 23 in which a plurality of said applicator unit carries a spring for resiliently urging each said smoothing roller to bear against said turf surface.

26. The mechanism of claim 1 further including means for flexibly connecting the applicator unit to said frame such that said applicator unit is movable vertically over the contour of the turf surface as said frame is driven across the turf surface.

27. The mechanism of claim 26 further including a locking apparatus that is selectively engaged with said means for flexibly connecting to constrain vertical movement of said applicator unit as said frame is driven across said turf surface.

* * * * *